(12) United States Patent
Appel et al.

(10) Patent No.: US 7,026,930 B2
(45) Date of Patent: Apr. 11, 2006

(54) PROCESS AND DEVICE FOR ADJUSTING A MOVABLE MOTOR VEHICLE PART

(75) Inventors: Josef Appel, Gauting (DE); Lucas Tragelehn, Reinchenbach (DE)

(73) Assignee: Webasto Vehicle Systems International GmbH, Stockdorf (DE)

( * ) Notice: Subject to any disclaimer, the term of this patent is extended or adjusted under 35 U.S.C. 154(b) by 96 days.

(21) Appl. No.: 10/620,801

(22) Filed: Jul. 17, 2003

(65) Prior Publication Data
US 2004/0090203 A1 May 13, 2004

(30) Foreign Application Priority Data
Jul. 17, 2002 (DE) .................. 102 32 413

(51) Int. Cl.
*G08B 13/00* (2006.01)

(52) U.S. Cl. ............... 340/541; 340/545.1; 340/545.5; 340/435; 348/148

(58) Field of Classification Search ........... 340/541, 340/545.1, 545.5, 435, 551, 561; 307/10.1; 318/445, 446
See application file for complete search history.

(56) References Cited

U.S. PATENT DOCUMENTS

| | | | |
|---|---|---|---|
| 5,081,406 A * | 1/1992 | Hughes et al. ........... | 318/478 |
| 5,764,008 A | 6/1998 | Hahn et al. | |
| 6,070,116 A | 5/2000 | Pruessel et al. | |
| 6,076,886 A | 6/2000 | Petri et al. | |
| 6,573,676 B1 | 6/2003 | Klesing | |
| 6,573,678 B1 * | 6/2003 | Losey et al. ............. | 318/470 |
| 6,836,209 B1 * | 12/2004 | Ploucha ................ | 340/435 |

FOREIGN PATENT DOCUMENTS

| | | |
|---|---|---|
| DE | 33 29 986 A1 | 2/1985 |
| DE | 37 31 428 A1 | 4/1989 |
| DE | 41 19 579 A1 | 12/1992 |
| DE | 195 07 541 C1 | 2/1996 |
| DE | 196 18 219 A1 | 11/1997 |
| DE | 198 16 054 A1 | 10/1998 |
| DE | 197 50 711 C2 | 9/1999 |
| DE | 198 40 161 A1 | 3/2000 |
| DE | 198 40 162 A1 | 3/2000 |
| DE | 198 40 163 A1 | 3/2000 |
| DE | 198 40 164 A1 | 3/2000 |
| DE | 199 59 990 A1 | 6/2000 |
| DE | 199 20 090 A1 | 11/2000 |
| DE | 199 31 014 A1 | 11/2000 |
| DE | 198 16 736 C2 | 11/2001 |
| DE | 100 43 099 A1 | 3/2002 |
| EP | 0 066 750 B1 | 12/1985 |

* cited by examiner

*Primary Examiner*—Julie Bichngoc Lieu
(74) *Attorney, Agent, or Firm*—David S. Safran

(57) ABSTRACT

In a process for adjusting a movable motor vehicle part (33) between at least two positions by means of a drive (42), the monitoring area (13, 30, 31) outside and/or inside the motor vehicle (10) is checked for at least one perturbing object (32). When a perturbing object (32) is detected within the monitoring area (13, 30, 31), the drive (42) is turned off or reversed. In this way, perturbing objects can be detected without contact and can be protected against pinching even before they are actually pinched.

16 Claims, 3 Drawing Sheets

PROCESS AND DEVICE FOR ADJUSTING A MOVABLE MOTOR VEHICLE PART

BACKGROUND OF THE INVENTION

1. Field of the Invention

The invention relates to a process and device for adjusting a movable motor vehicle part between at least two positions by means of a drive.

2. Description of Related Art

The prior art discloses various possibilities for detecting and prevent pinching of an article or body part, for example, by an openable motor vehicle roof, etc.

Thus, it is known, for example, that pinch protection can be accomplished for adjustable covers of an openable motor vehicle roof by monitoring the operating parameters of the cover drive motor. Here, the motor current, its change over time, or the torque of the drive motor can be monitored; see, for example, published German Patent Applications DE 198 40 161 A1, DE 198 40 162 A1, DE 198 40 163 A1, and DE 198 40 164 A1 and its counterpart U.S. Pat. No. 6,753,676, German Patent DE 33 29 986 C2, published German Patent Application DE 196 18 219 A1, and its counterpart U.S. Pat. No. 6,070,116 and German Patent DE 195 07 541 C1 and its counterpart U.S. Pat. No. 5,764,008.

Furthermore, anti-pinching devices for an adjustable cover of an openable motor vehicle roof are known, for example, from published German Patent Applications DE 37 31 428 A1 and DE 195 35 796 A1 and German Patent DE 197 50 711 C2 and its counterpart U.S. Pat. No. 6,076,886, in which pinch sensors are mounted on the front edge of the cover or the front edge of the roof opening, and can be formed, for example, as piezoelectric pressure sensors in the form of optical fibers or as FSR sensor elements which change their resistance under pressure. Since these sensors must be provided over the entire width of the roof opening to accomplish effective pinching protection, this pinch protection is very complex and expensive.

The above described anti-pinching systems have the disadvantage that they only react when clamping forces occur. In doing so, as a result of the great inert masses, large pinching forces occur until the drive stops so that the pinched object is first exposed to greater forces.

Published German Patent Application DE 198 16 054 A1 describes a camera system for monitoring the motor vehicle vicinity which cannot be directly viewed, in which the camera can be adjusted in two working positions with different focal widths and angles to the roadway. The cameras of the camera system are distributed over the motor vehicle. Furthermore, there is a display device which displays to the driver the images recorded by the camera.

Published German Patent Application DE 199 20 090 A1 describes an electronic passenger car parking aid which facilitates parking next to the curb and warns against contact with it. In doing so, ultrasonic sensors on the front and back in the area of the bumpers are mounted on the motor vehicle and face the roadway at different angles. When parking, the sensor field is penetrated and a signal sounds.

Published German Patent Application DE 199 31 014 A1 discloses a distance sensor for a motor vehicle which covers at least the entire side area of the motor vehicle. A laser scanner is used which is located in the mirror joint, in the outside mirror or in the mirror housing itself.

Published German Patent Application DE 143 099 A1 describes a process for monitoring the rear area of the motor vehicle. In doing so, the side rearview mirror of the motor vehicle is replaced by a video camera which allows at least two different imaging scales for different image angles. The different pictures are displayed to the driver in succession on one or at the same time on two monitors.

SUMMARY OF THE INVENTION

A primary object of this invention is to devise a process and device for adjusting a movable motor vehicle part between at least two positions by means of a drive, with which premature and comprehensive pinch protection is economically implemented.

This object is achieved by a process and a device in accordance with the invention in which at least one sensor and/or at least one camera is located in one or more of the outside mirror, bumper, taillights, headlights, turn signals, mudguard, shelf, roof strip, tailgate and door of the motor vehicle.

According to the invention, a movable motor vehicle part is moved between at least two positions by means of a drive which can be electrical, pneumatic, hydraulic, etc. The adjustment can take place in the direction of opening or closing or up or down. Furthermore, the monitoring area outside and/or inside the motor vehicle is checked for at least one perturbing object. When a perturbing object is detected within the monitoring area, the drive is turned off or reversed. The perturbing object can also mean only part of such an object. The detection of the perturbing object within the monitoring area can likewise include the detection of the entry of the perturbing object into the monitoring area. The perturbing object need not be located completely within the area.

The monitoring area can include several component areas. They are, for example, the left or right vehicle side area, the rear vehicle area, the front vehicle area or also the top area of the vehicle. Furthermore, the monitoring area can also include only parts of the indicated areas.

To check the monitoring area, sensors, i.e., for example, distance sensors, motion sensors, and/or motion direction sensors can be used which in turn can encompass radar sensors, ultrasonic sensors, or also laser scanners. Moreover, one or more cameras can also be used. A combination of different sensors and/or cameras is likewise possible.

The monitoring area or its component areas can then be established depending on the sensors or cameras which are used. Obviously, for reasons of cost, as few sensors or cameras as possible are used, but also as many as is necessary for reliable monitoring to protect against pinching.

To process the signals or data acquired or recorded by the sensors, there can be a data processing means. It can process the data accordingly, i.e., evaluate them, and thus, enable detection of one or more perturbing objects. It can relate especially to the data or pictures which have been recorded by the camera and/or the data recorded by the laser scanner.

The sensors and/or cameras can be located at the most varied locations of a motor vehicle. They can be the following: outside mirror, bumper, taillights, headlights, blinkers, mudguards, shelf, roof strip, tailgate, or door, etc. Components of the motor vehicle which already have a cable feed are especially well suited. However, if there is cableless signal transmission, for example, via radio, a location with a suitable cable connection need not be considered.

The movable motor vehicle part can be for example a window, an openable motor vehicle roof, i.e., for example, a sliding roof, a sliding and lifting roof, a spoiler roof, a folding roof, a louvered roof, etc., and an antenna, a convertible top, for example, of a convertible, or also only parts thereof. In turn, the arrangement and the number of required sensors and/or cameras can be dependent on them.

If the perturbing object, such as, for example, an individual, is detected within the monitoring area, it can be a good idea to deliver a warning signal in order to warn him accordingly against possible pinching. This warning signal is, for example, an optical or acoustic signal or both. In this way, pinch protection can be accomplished even more efficiently. However, the warning signal can also be useful for the operator of the adjustment mechanism so that he is notified, for example, that the drive is being stopped or reversed and why. However, it is also conceivable to divide the monitoring area into an outer and an inner area, and when an object enters the outer area a warning signal can be delivered and only when the object enters the inner area is the drive stopped or reversed. The outer boundary of the monitoring area should not have a distance from the motor vehicle which is too great, since otherwise objects could also be detected which do not constitute perturbing objects in the sense of the invention, i.e., which need not be protected against pinching since they do not come too near the movable motor vehicle part.

After detection of one or more perturbing objects within the monitored area, checking continues to be carried out, for example. In doing so, if it is ascertained that the perturbing object has left the monitored area or that there is no longer a perturbing object in the monitored area, the drive can be cleared for re-actuation, for example, by the driver; but it is also possible for the driver to continue the original displacement of the motor vehicle part which was undertaken before shutoff or reversal. In this way, the operator of the drive need not await the correct instant, but the instant is automatically recognized. The operator can then change his mind and actuate, for example, a stop button or the like. The above described approach can also be feasible when the drive is actuated by remote control.

For reasons of cost, it is advantageous to use possibly already present sensors and/or cameras which are used, for example, for support during parking or in general to improve the visibility for the driver. For this purpose, suitable signal processing or signal evaluation can be incorporated into the existing electrical control of the motor vehicle.

The invention is explained in detail below by way of example using the accompanying drawings.

DETAILED DESCRIPTION OF THE INVENTION

Figure 1:
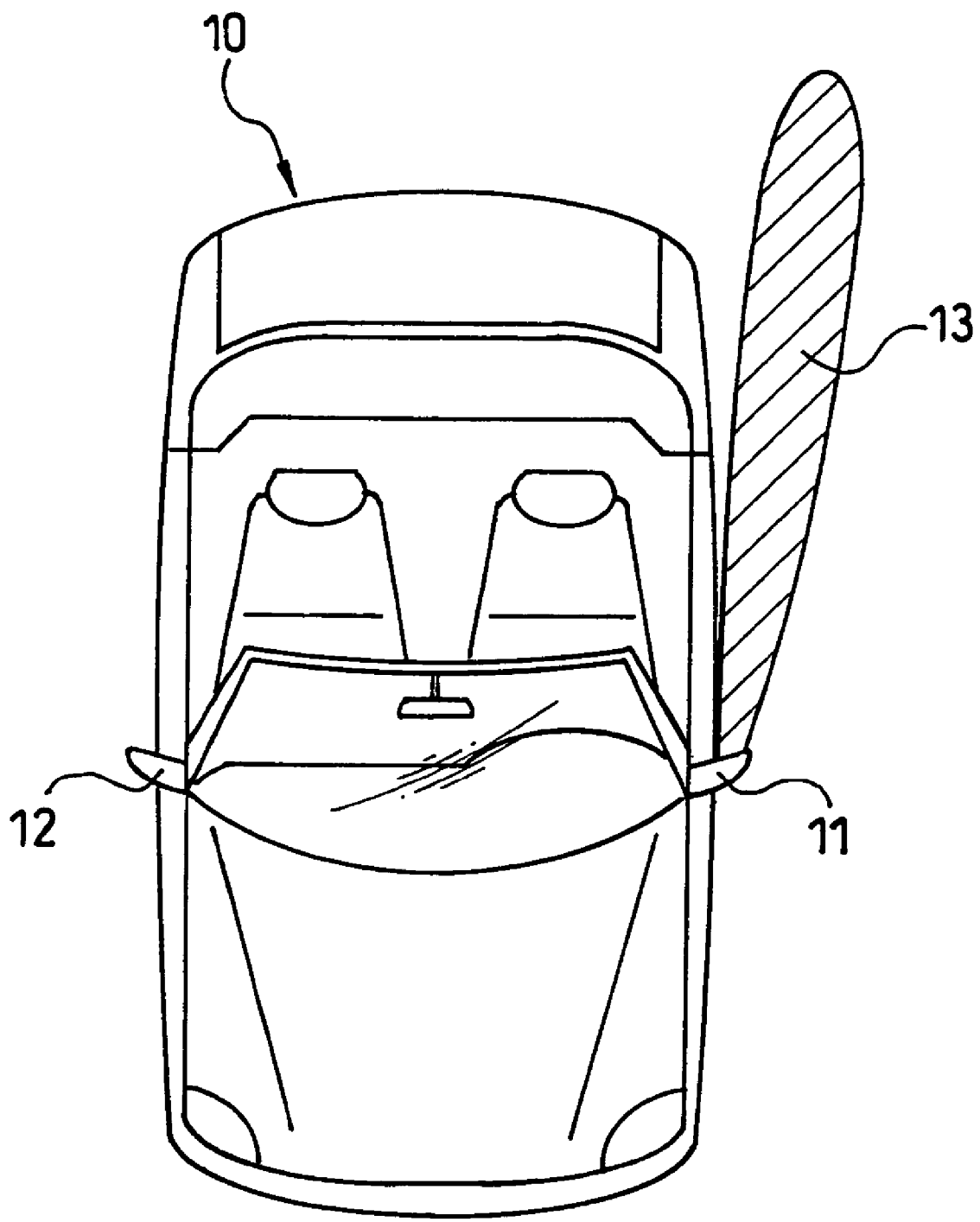
FIG. 1 is plan view of a convertible with a monitoring area laterally of the motor vehicle.
Figure 2:
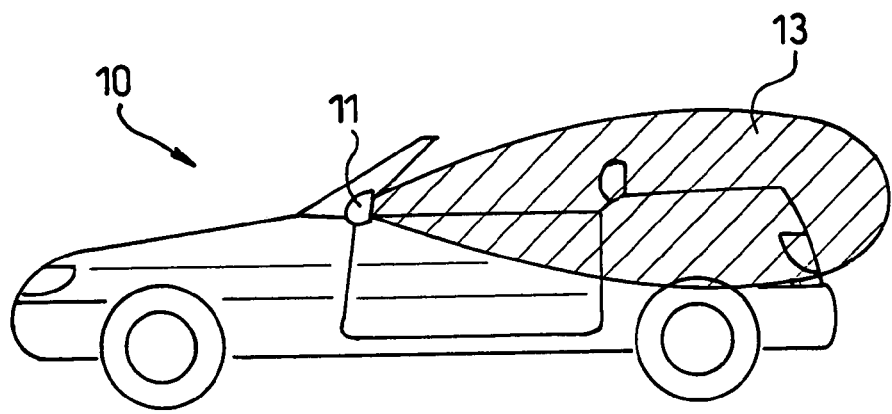
FIG. 2 shows the corresponding side view the FIG. 1 convertible.

FIG. 1 shows a motor vehicle 10 in the form of a convertible with an opened roof A sensor (not shown), which covers a limited monitoring area 13, is attached to one of the two outside mirrors 11,12. Of course, the corresponding monitoring area of a corresponding sensor can also be set up on the other outside mirror. A side view of monitoring area 13 is shown in FIG. 2. Here, it is apparent that the monitoring area is set up above the roadway. This can be sufficient, since the monitoring area covers most of the side pinch danger area. For this purpose, only one sensor, for example, an ultrasonic sensor, is required, for example.

Figure 3:
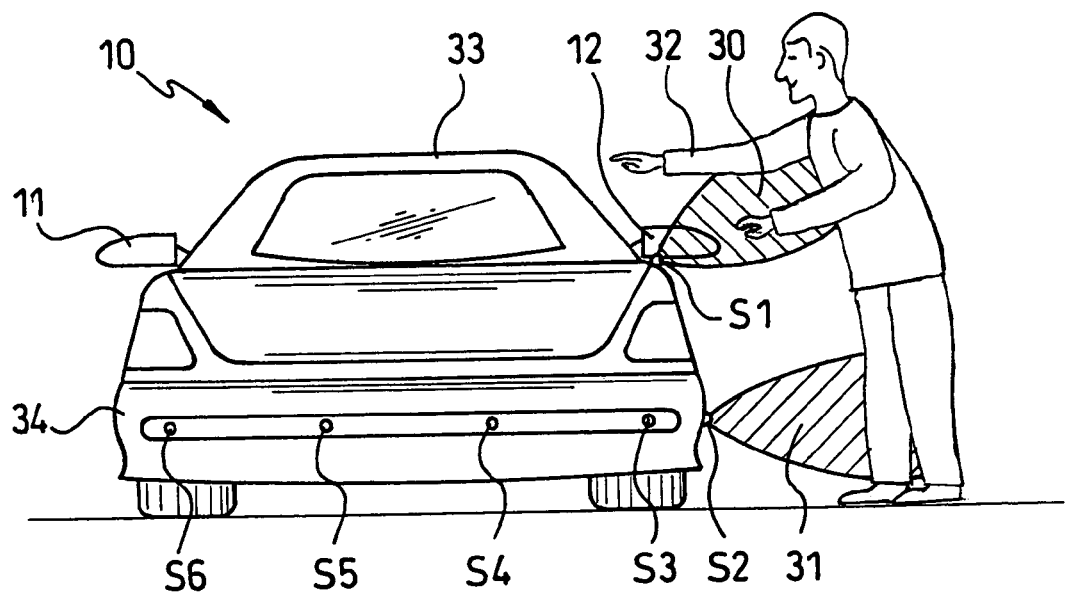
FIG. 3 is a rear view of a motor vehicle with different sensors.

Another embodiment of the invention is shown in FIG. 3. A motor vehicle 10 in a rear view is shown there. Sensors S1 to S6 are mounted at different locations on the vehicle. A sensor S1 is located on the outer side mirror and covers a partial monitoring area 30. Another sensor S2 is located laterally underneath on the bumper and covers the partial monitoring area 31. The partial monitoring areas of the other sensors S3 to S6 are not shown. They advantageously are directed rearward of the motor vehicle and can, for example, be sensors for support when parking. The sensor S2 can likewise be a sensor which is used for support when parking the motor vehicle. Likewise this can of course also apply to the sensor S1.

The illustrated individual 32 approaches the vehicle 10 or is located within the monitoring area 30, 31. The individual 32 is detected as a perturbing object so that the drive which, for example, moves the motor vehicle roof or convertible top 33 of the motor vehicle is turned off or reversed. Thus, pinching of, for example, the finger of the individual 32 between the convertible top 33 of the vehicle and the lower part of the vehicle can be prevented. In this way, there is no pinching at all, as is the case in other known anti-pinching systems.

Figure 4:
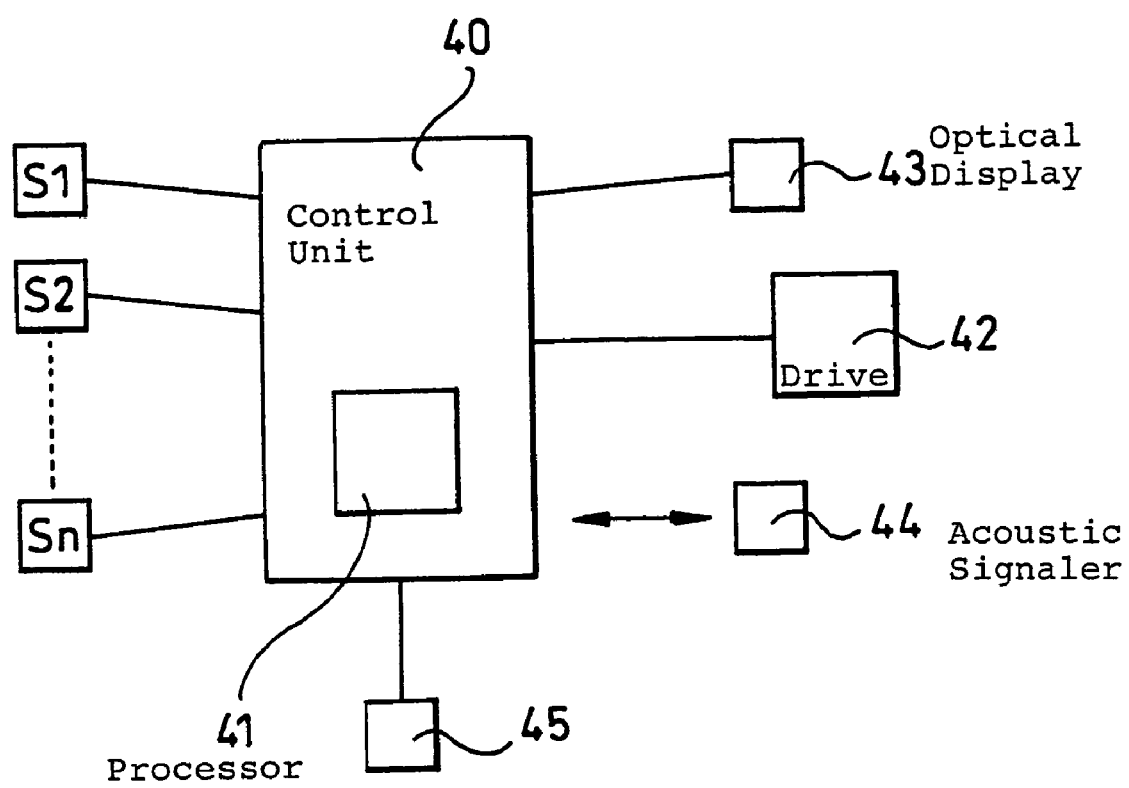
FIG. 4 is a block diagram of one embodiment of the device in the invention.

FIG. 4 shows a block diagram of one embodiment of the device in accordance with the invention. A control unit 40 which can be, for example, an existing control unit of the motor vehicle or can be integrated into it is connected by cable or wirelessly to various sensors or cameras S1, S2 to Sn for signal transmission. Control unit 40 evaluates the signal originating from the sensors or cameras and depending on them, shuts off or reverses the drive 42 which is connected to it. The control unit 40 has a data processing means 41 which can, for example, carry out video processing and/or evaluation of images of one or more cameras S1 to Sn which may be present in order to detect one or more perturbing objects within the monitoring area. Depending on this data, processing the control unit can shut off or reverse the drive 42.

Furthermore, the control unit 40 is connected to an optical display means 43 and an acoustic signaler 44, for example to a speaker. They are activated or actuated, for example, when a perturbing object is detected within the monitoring area. Moreover, there is a remote control 45 which, for example, delivers signals for control of the drive 42 to the control unit which can then actuate the drive 42 accordingly. It is also possible for the control unit 40 to trigger an optical and/or acoustic signal on the remote control 45 when a perturbing object is detected within the monitoring area.

What is claimed is:

1. Process for displacing a movable part of motor vehicle between at least two positions by means of a drive, comprising the steps of:
    checking a monitoring area at least one of outside and inside the motor vehicle for the presence at least one perturbing object without contact between the movable part and the perturbing object, and
    turning off or reversing the drive when a perturbing object is detected within the monitoring area,
    wherein the movable part is at least one of a vehicle window, an openable motor vehicle roof, an antenna, a convertible top and a part thereof; and
    wherein said monitoring area is aimed away from the path of the movable part.

2. Process as claimed in claim 1, in which the monitoring area includes at least of the following component areas:
- a vehicle side area,
- a rear vehicle area,
- a front vehicle area, and
- a top area of the vehicle.

3. Process as claimed in claim 1, in which said checking step is performed by means of at least one of at least distance sensor, at least motion sensor and at least one motion direction sensor.

4. Process as claimed in claim 2, in which said checking step is performed by means of at least one of radar, ultrasound and laser scanning sensors.

5. Process as claimed in claim 4, in which said checking step is performed by means of at least one camera.

6. Process as claimed in claim 5, in which data recorded by the at least one camera is subjected to data processing for determining the presence a perturbing object within the monitoring area.

7. Process as claimed in claim 3, in which said checking step is performed by means of at least one of a sensor and a camera located in at least one an outside mirror, a bumper, taillights, headlights, turn signals, mudguards, a shelf, a roof strip, a tailgate and a door of the vehicle.

8. Process as claimed in claim 1, in which at least one of an optical and an acoustic warning signal is delivered when a perturbing object is detected within the monitoring area.

9. Process for displacing a movable part of motor vehicle between at least two positions by means of a drive, comprising the steps of:
- checking a monitoring area at least one of outside and inside the motor vehicle and that is away from a path of movement of the movable part for the presence at least one perturbing object without contact between the movable part and the perturbing object, and
- turning off or reversing the drive when a perturbing object is detected within the monitoring area,
- wherein the movable part is at least one of a vehicle window, an openable motor vehicle roof, an antenna, a convertible top and a part thereof;
- wherein said checking step continues to be performed after detection of a perturbing object within the monitoring area, and when the perturbing object is determined to have left the monitoring area, the drive is cleared for one of re-actuation and continued displacement.

10. Process for displacing a movable part of motor vehicle between at least two positions by means of a drive, comprising the steps of:
- checking a monitoring area at least one of outside and inside the motor vehicle for the presence at least one perturbing object without contact between the movable part and the perturbing object, and
- turning off or reversing the drive when a perturbing object is detected within the monitoring area,
- wherein the movable part is at least one of a vehicle window, an openable motor vehicle roof, an antenna, a convertible top and a part thereof;
- wherein said checking step is performed by means of at least one of at least one distance sensor, at least one motion sensor and at least one motion direction sensor;
- wherein said checking step is performed by means of at least one of a sensor and a camera located in at least one an outside mirror, a bumper, taillights, headlights, turn signals, mudguards, a shelf, a roof strip, a tailgate and a door of the vehicle; and wherein the at least one of a sensor and camera is also used as a vehicle parking assistant.

11. Device for displacing a movable motor vehicle part between at least two positions, comprising:
- a drive which displaces the movable vehicle part, and
- a control means for:
  - checking a monitoring area at least one of outside and inside the motor vehicle for the presence at least one perturbing object without contact between the movable part and the perturbing object, and
  - one of turning off and reversing the drive when a perturbing object is detected within the monitoring area even when the detected object does not contact the movable part;
- wherein the movable part is at least one of a vehicle window, an openable motor vehicle roof, an antenna, a convertible top and a part thereof; wherein said monitoring area is aimed away from the path of the movable part.

12. Device as claimed in claim 11, further comprising at least one of at least one distance sensor, at least one motion sensor, at least one motion direction sensor, and at least one camera which are connected to the control unit.

13. Device as claimed in claim 12, in which the control unit has a data processing means for processing data signals of the at least one sensor or camera for detecting the perturbing object.

14. Device as claimed in claim 12, wherein said at least one of a sensor and a camera are located in at least one an outside mirror, a bumper, taillights, headlights, turn signals, mudguards, a shelf, a roof strip, a tailgate and a door of the vehicle.

15. Device as claimed in claim 11, further comprising at least one of an optical and an acoustic warning signally device, said control means being operative for triggering issuance of a warning signal by said signally device when a perturbing object is detected within the monitoring area.

16. Device for displacing a movable motor vehicle part between at least two positions, comprising:
- a drive which displaces the movable vehicle part, and
- a control means for:
  - checking a monitoring area at least one of outside and inside the motor vehicle and away from a path of movement of the movable part for the presence at least one perturbing object without contact between the movable part and the perturbing object, and
  - one of turning off and reversing the drive when a perturbing object is detected within the monitoring area;
- wherein the movable part is at least one of a vehicle window, an openable motor vehicle roof, an antenna, a convertible top and a part thereof; and
- wherein said control means is operative for terminating said one of turning off and reversing the drive to be terminated and for enabling one of re-actuation and continued displacement of the movable part when the perturbing object is determined to have left the monitoring area.

* * * * *